United States Patent
Blau et al.

(10) Patent No.: US 9,912,401 B2
(45) Date of Patent: *Mar. 6, 2018

(54) ADAPTIVE FADE MITIGATION

(71) Applicant: Gilat Satellite Networks Ltd., Kiryat Arye, Petah Tikva (IL)

(72) Inventors: Timor Blau, Ramat-Gan (IL); Dubi Lever, Hashmonaim (IL); Eli Shapira, Ramle (IL); Moti Goldshtein, Hod-Hasharon (IL); Ori Porat, Gan-Sorek (IL)

(73) Assignee: Gilat Satellite Networks Ltd., Petah Tikva (IL)

(*) Notice: Subject to any disclaimer, the term of this patent is extended or adjusted under 35 U.S.C. 154(b) by 0 days.

This patent is subject to a terminal disclaimer.

(21) Appl. No.: 15/386,951

(22) Filed: Dec. 21, 2016

(65) Prior Publication Data

US 2017/0302365 A1   Oct. 19, 2017

Related U.S. Application Data

(63) Continuation of application No. 13/664,650, filed on Oct. 31, 2012, now Pat. No. 9,559,767.

(60) Provisional application No. 61/577,310, filed on Dec. 19, 2011.

(51) Int. Cl.
H04B 7/185 (2006.01)

(52) U.S. Cl.
CPC ..... H04B 7/18513 (2013.01); H04B 7/18543 (2013.01)

(58) Field of Classification Search
CPC ..... H04W 12/08; H04W 12/12; H04W 12/02; H04W 12/00; H04W 4/02; H04W 64/006; H04W 52/08; H04B 17/318

See application file for complete search history.

(56) References Cited

U.S. PATENT DOCUMENTS

| | | | |
|---|---|---|---|
| 4,776,035 A | 10/1988 | Duggan | |
| 6,292,660 B1* | 9/2001 | Hartless | H04W 48/16 340/7.42 |

(Continued)

FOREIGN PATENT DOCUMENTS

| | | |
|---|---|---|
| WO | 200018035 A1 | 3/2000 |
| WO | 2008129509 A1 | 10/2008 |

OTHER PUBLICATIONS

Partial European Search Report—EP12191118.4—dated Jul. 9, 2013.

(Continued)

*Primary Examiner* — Andrew Wendell
*Assistant Examiner* — Maryam Soltanzadeh
(74) *Attorney, Agent, or Firm* — Banner & Witcoff, Ltd.

(57) ABSTRACT

A satellite communications system comprising a Hub station and a plurality of terminals, the system is configured to utilize a FWD link and a RTN link in accordance with adaptation techniques for relevant transmission properties (e.g. modulation, coding, transmission power, etc.) and to use adaptive margins to ensure proper reception of transmitted information under various link conditions. Methods are presented for determining said adaptive margins in real time or substantially in real time, and for setting relevant transmission properties in accordance with the determined margins. Adaptive margins may be determined either directly or following the determining of a link state for each of the FWD link and the RTN link.

20 Claims, 5 Drawing Sheets

(56) References Cited

U.S. PATENT DOCUMENTS

| | | | | |
|---|---|---|---|---|
| 7,257,417 B1* | 8/2007 | Krasner | .................... | G01P 3/50 |
| | | | | 342/357.68 |
| 8,270,500 B2* | 9/2012 | Tidestav | ............... | H04L 1/0019 |
| | | | | 370/252 |
| 8,619,921 B2* | 12/2013 | Shiokawa | ........... | H04L 25/0212 |
| | | | | 375/260 |
| 8,897,207 B2* | 11/2014 | Argov | .................. | H04B 7/1858 |
| | | | | 370/317 |
| 2003/0054816 A1* | 3/2003 | Krebs | ................ | H04B 7/18582 |
| | | | | 455/428 |
| 2009/0196248 A1 | 8/2009 | Zhang et al. | | |
| 2009/0296629 A1 | 12/2009 | Lincoln et al. | | |
| 2010/0285826 A1* | 11/2010 | Bourdeaut | ............ | H04L 1/0003 |
| | | | | 455/513 |
| 2012/0113890 A1* | 5/2012 | Chen | .................. | H04B 7/18517 |
| | | | | 370/319 |

OTHER PUBLICATIONS

Max M. J. L. Van De Kamp: "Statistical analysis of rain fade slope", IEEE Transactions on Antennas and Propagation. IEEE Service Center. Piscataway. NJ. US. vol. 51. No. 8. Aug. 1, 2003 (Aug. 1, 2003), pp. 1750-1759.
Extended European Search Report—EP12191118.4—dated Apr. 4, 2014.
Sep. 14, 2017—Extended ISR—EP App. No. 17173467.6.

* cited by examiner

ADAPTIVE FADE MITIGATION

CROSS-REFERENCE TO RELATED APPLICATIONS

This application is a continuation of and claims priority to U.S. patent application Ser. No. 13/664,650, filed Oct. 31, 2012 and entitled "Adaptive Fade Mitigation", which claims priority to U.S. Provisional Application Ser. No. 61/577,310, filed Dec. 19, 2011 and entitled "Adaptive Fade Mitigation," which are each hereby incorporated by reference in their entirety.

FIELD OF THE INVENTION

This disclosure pertains, in general, to communication systems and more particularly to the field of satellite communication systems.

BACKGROUND

Two way satellite communication systems may often include a forward (FWD) satellite link and a return (RTN) satellite link. These links may be utilized for transferring information (data) between a central station, for example a Gateway or a Hub, and one or more terminals, for example Very Small Aperture Terminals (VSATs). Such systems may utilize adaptive waveforms, like or similar to those defined in ETSI' s DVB-S2 ACM (Digital Video Broadcasting—Satellite—Second Generation, Adaptive Coding and Modulation) and/or DVB-RCS (Digital Video Broadcasting—Return Channel via Satellite) standards, which may allow adaptive allocation of satellite resources on per terminal basis.

Adaptive techniques may often be used for mitigating the effects of satellite link fade, as may be experienced at terminals locations. In one such technique, feedback information regarding FWD link reception quality may be periodically transmitted by each terminal over the RTN link to a Hub, which may use the information for selecting modulation and FEC combinations (MODCODs) for transmission towards these terminals over the FWD link. Another technique often applied for counteracting fade may involve transmission power adaptation.

Practically all techniques used for mitigating the effects of satellite link fade include use of margins. However, a problem exists in higher frequency bands (for example the Ka-band), as conventional margins are inadequate. With changes in link conditions being more rapid and of higher magnitude, higher system margins compensate for such changes, which may occur in between estimations of the link conditions. On the other hand, system margins may be considered as overheads, i.e. they may reduce the total resources available for transferring information and/or result in requiring more expensive equipment (e.g. higher power transmitters, larger antennas, etc.). Hence a suitable solution is helpful to address these issues.

As previously described, ETSI's recommendations and standards may include disclosures of adaptive waveforms. The DVB-S2 recommendations (EN 302307) may disclose an Adaptive Coding and Modulation waveform for a FWD link. The DVB-RCS recommendations (EN 301790) may disclose a scheme for a return link supporting multiple channels of different symbol rates and multiple timeslot types with different modulation and coding properties. However, neither teaches how to determine appropriate parameters for each transmission, nor how to select system margins for countering changes in link conditions.

Methods for controlling transmission parameters, specifically transmission power, may be disclosed in U.S. Pat. No. 6,212,360 to Fleming et al (titled Methods and Apparatus for Controlling Earth-Station Transmitted Power in a VSAT Network). However, the methods that may be disclosed by Fleming are inapplicable to adaptive waveforms, as they do not account for possible changes in other signal parameters (for example symbol rate and MODCOD). Moreover, Fleming may have no teaching regarding the setting of system margins.

U.S. application Ser. No. 12/337,330 to Ben-Laish et al (titled Multi-Dimensional Adaptive Transmission Techniques), which is assigned to the applicant, discloses embodiments which can have quasi-error-free communication at a highest efficiency level available under changing link conditions and network configurations without requiring reservation of substantial power margins.

Furthermore, U.S. application Ser. No. 12/027,887 to Martin et al (titled Combined Open and Closed Loop Power Control in a Communications Satellite) may disclose a method for controlling transmission power at a terminal. However, Martin does not disclose anything regarding a system margin, nor it discloses use of said estimations for determining a system margin, either for optimizing throughput or for any other purpose.

BRIEF SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some aspects of the disclosure in a simplified form as a prelude to the description below Aspects of the disclosure are directed to methods for minimizing system margins in an adaptive satellite communications system comprising a Hub and a plurality of terminals. Reduction of a preferred system margin may enable reduction of preferred transmission power (either for a terminal, for a Hub, or for both) and/or increase in spectral efficiency (e.g. due to a higher order MODCOD being usable per given link conditions).

Aspects of the disclosure are directed to a method for determining a FWD link allocation margin. A Hub may be configured to analyze FWD channel reception level estimations received from a terminal, to determine a fade rate corresponding to the terminal, and to determine a margin corresponding to the terminal in accordance with the determined fade rate. In some embodiments, said margin may be calculated directly from the determined fade rate, perhaps while considering additional factors. In some embodiments, the Hub may be configured to use said FWD channel reception level estimations in order to determine a FWD link state for the terminal and to determine said margin in accordance with the determined FWD link state. The FWD link state may be one of two or more link states, wherein one of these states may be associated with stable link conditions and the other one or more states may be associated with link conditions of different degrees of instability. The Hub may be configured to determine a relatively low margin for the terminal if the FWD link state corresponds to stable link conditions, and to determine a relatively higher margin if the FWD link state corresponds to instable link conditions.

Aspects of the disclosure are directed to a method for determining and/or controlling a transmission power level of a RTN link signal transmitted by a terminal. A terminal may be configured to analyze RTN channel reception level estimations received from a Hub and locally generated FWD channel reception level estimations, and to adaptively determine a transmission margin that may be added to a transmission level that may be preferred in accordance with parameters of a transmission to be transmitted (e.g. symbol rate, modulation, FEC, etc.).

Aspects of the disclosure are directed to a method for determining an adaptive allocation margin for a RTN link. A Hub may be configured to receive utility transmissions from a terminal, wherein the transmissions include transmission capability information, to estimate reception level for said received utility transmissions, to determine a transmission capability for the terminal based on the received information and on the reception level estimations, and to determine a RTN link state based on capability fluctuations or change rate. Upon determining a RTN link state for the terminal, the Hub may determine an allocation margin corresponding to the RTN link state and consider this allocation margin upon allocating RTN channel resources to the terminal, wherein a relatively lower allocation margin may be considered when the RTN link is in a stable state and a higher allocation margin may be considered when the RTN link is in an instable or less state.

Aspects of the disclosure are directed to a possible linkage between a FWD link state and a RTN link state.

DETAILED DESCRIPTION

Figure 1:
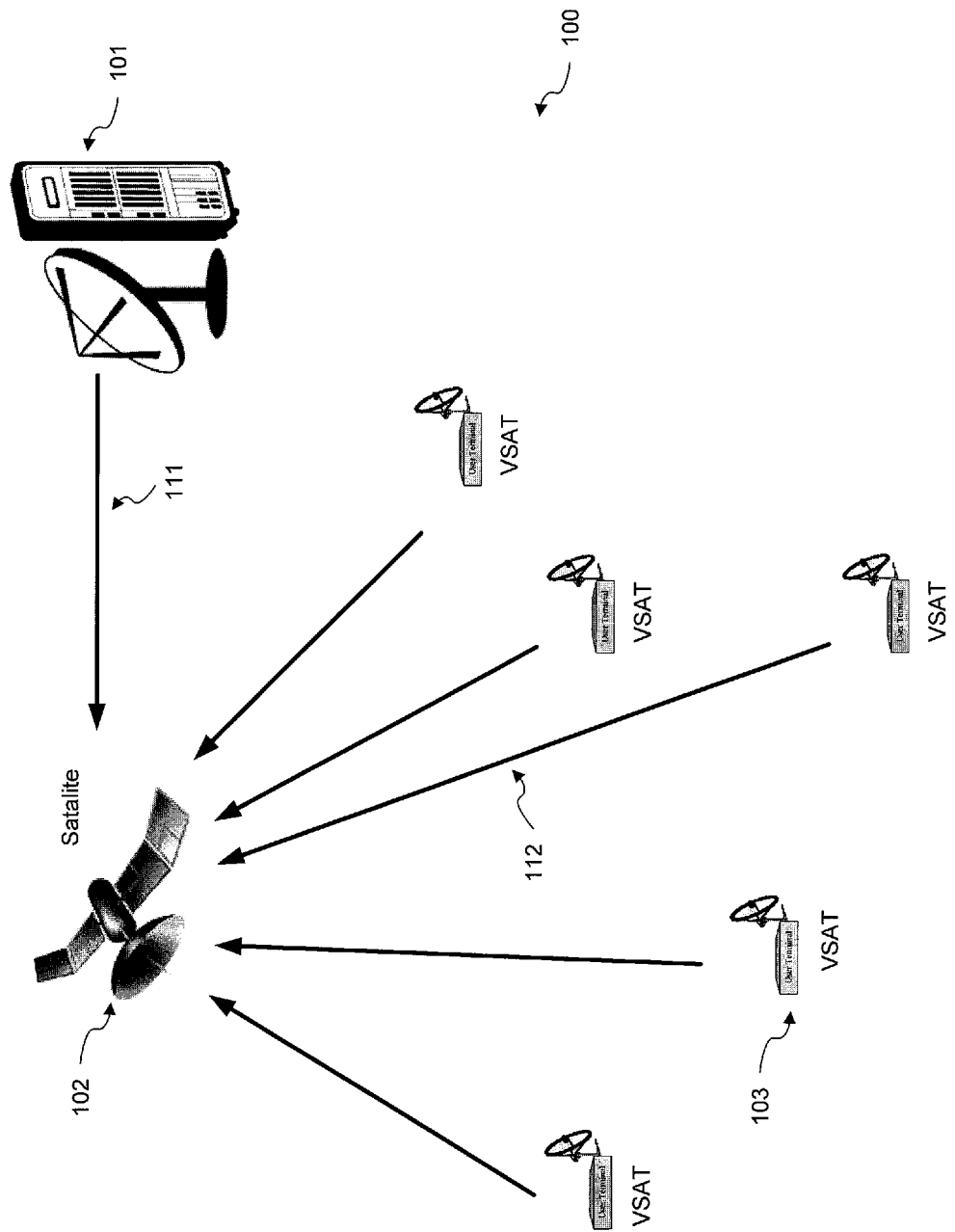
FIG. 1 shows a satellite communication system in accordance with aspects of the disclosure.

FIG. 1 shows a satellite communications system 100, which may comprise at least one Hub station 101, at least one satellite 102, and a plurality of terminals 103. System 100 may be configured to utilize a FWD channel (carrier) 111. In exemplary embodiments, system 100 may be configured to maintain either a constant or variable power level for the FWD channel carrier. In embodiments where a constant power level for the FWD channel carrier is maintained, the FWD channel carrier may be transmitted at said constant power level by satellite 102 in the downlink towards one or more of the terminals 103. In some embodiments, system 100 may be configured to achieve such maintaining through using at least an uplink power control (UPC or ULPC) mechanism at Hub 101 or an automatic downlink power control function in satellite 102. System 100 may be further configured to utilize one or more RTN channels (carriers) 112, which may be transmitted by terminals 103 at various power levels, for example in accordance with adaptation techniques that may be employed by terminals 103. In some embodiments, FWD channel 111 may follow an adaptive coding and modulation waveform (for example in accordance with DVB-S2 ACM). In some embodiments, RTN channels 112 may follow an adaptive scheme as well (for example in accordance with DVB-RCS).

Hub 101 may be configured to select a MODCOD for the FWD channel (link), which may best fit the FWD channel reception conditions (e.g. as may be measured in any of the following in any combination and/or subcombination: signal to noise ratio (SNR), normalized energy per symbol (Es/N0), normalized energy per bit (Eb/N0), or other suitable techniques). Since spectral efficiency (e.g. the number of user bits per transmitted symbol) is usually linear to reception level, in some embodiments where the purpose of said selection may be to maximize spectral efficiency, Hub 101 may be configured to select a MODCOD associated with a reception quasi-error-free (QEF) threshold as close to, yet lower than, the current FWD channel reception level at a receiving terminal (e.g. in order to avoid unacceptable error rate). However, where link conditions are volatile, operation close to the QEF threshold may result in errors (i.e. due to FWD channel reception level falling below the QEF threshold of the selected MODCOD) hence a margin may be considered in said selection. Hub 101 may be configured to select a MODCOD associated with a reception QEF threshold which may be close to, yet lower than, the current FWD channel reception level at a receiving terminal minus said margin.

In order for Hub 101 to perform said MODCOD selection on a per terminal basis, Hub 101 may utilize knowledge of FWD channel reception level at each terminal 103. Thus, a terminal 103 may be configured to periodically send FWD channel reception level estimations to hub 101 (i.e. over the RTN link). The rate at which terminal 103 may transmit FWD channel reception level estimations towards Hub 101 may be preconfigured and determined as a tradeoff between a need to minimize the bandwidth (or capacity) utilized for network management traffic, and a need to minimize the adaptivity (ACM) loop response time. In some embodiments, each terminal 103 may be configured to transmit a FWD channel reception level estimation at a typical rate of about once per second. In some embodiments, where the RTN link may follow the DVB-RCS recommendations, FWD channel reception level estimations may be included (piggy-backed) in SYNC transmissions, which may be transmitted at a similar rate, i.e. at about once per second per terminal 103.

Therefore, Hub 101 may be configured to receive said FWD channel reception level estimations, select an appropriate MODCOD per terminal 103, e.g. as described above, and then to use the selected MODCOD for transmitting information to terminal 103 over the FWD link, wherein information destined to different terminals may be transmitted using different MODCODs in accordance with said MODCOD selection. It should be noted that the above described technique may be applicable also to embodiments where FWD link adaptation may be possible by modifying properties of the transmitted FWD carrier other than MODCOD.

Furthermore, Hub 101 may be configured to perform said MODCOD selection (and possibly utilization) wherein the selection may include consideration of a preconfigured margin (for example, in order to reduce BER probability should link conditions become volatile). Said margin may be preconfigured in accordance with a round trip delay between Hub 101 and terminal 103, an interval between consecutive FWD channel reception level estimations transmitted by terminal 103, and a preconfigured maximal link fade rate. Upon receiving a FWD channel reception level estimation from terminal 103, Hub 101 may be configured to deduct the margin from the received estimation, thus calculating for a similar drop in reception level until a subsequent FWD channel reception level estimation may be received. Hub 101 may then compare the reduced reception level figure against a preconfigured table containing for each applicable MODCOD at least its QEF threshold, and then select the MODCOD having the highest QEF threshold that is still lower than the reduced reception level figure. It should be noted that similar results may be achieved by using a table where the thresholds already include the margin (i.e. the values in the table may represent QEF thresholds plus the margin) and by comparing the received FWD channel reception level with the values in said table.

However, a margin which may be useful for protecting a transmission during link instability periods may be excessive during periods where the link is relatively stable. Since most satellite links are often stable most of the time and instable during relatively short periods only, using a single margin corresponding to instable link conditions at all times may result in waste of resources. A first MODCOD selected using a margin suitable for instable conditions during periods in which the link may be stable may be less efficient (i.e. less user bits per symbol) than a second MODCOD which may be selected at these periods should a lower margin may be considered (e.g. a MODCOD having higher QEF threshold often supports more user bits per symbol than a MODCOD having lower QEF threshold).

Aspects of the disclosure are directed to Hub 101 of system 100, which may be configured to analyze FWD channel reception level estimations received from a terminal 103, to determine a fade rate corresponding to terminal 103 based on said analysis, and to determine a margin corresponding to terminal 103 in accordance with the determined fade rate, wherein determining said margin includes consideration of a round trip delay between Hub 101 and terminal 103, an interval between consecutive FWD channel reception level estimations transmitted by terminal 103, and a preconfigured maximal link fade rate. For example, where system 100 may be configured to operate in the Ku-band, the maximal fade rate may be preconfigured to a value of 1 dB/Sec. In another example, where system 100 may be configured to operate in the Ka-band, the maximal fade rate may be preconfigured to a value of 5 /Sec. In some embodiments, terminal 103 may be configured to determine a fade rate in real time, or substantially in real time, and to report the determined fade rate to Hub 101 in addition to reporting a FWD channel reception level estimations. Terminal 103 may be configured to estimate the FWD channel reception level at a higher rate than the rate of transmitting such estimations towards Hub 101 hence terminal 103 may determine a fade rate more accurately than Hub 101. In some further embodiments, in addition to determining a fade rate, terminal 103 may be configured to also determine in real time, or substantially in real time, a preferred margin, for example based on analyzing minimum and/or maximum values of FWD channel reception level estimation over predefined intervals, and to transmit said preferred margin to Hub 101 along with said FWD channel reception level estimations. In such embodiments, Hub 101 may be configured to decide whether to use a fade rate value that may be provided by terminal 103, and/or to use a preferred margin value provided by terminal 103 (e.g. in order to select a MODCOD on the FWD link for terminal 103), or to consider other inputs as well (for example measurements related to the RTN link) in order to determine a preferred margin.

In some embodiments, Hub 101 may be configured to determine a link state for terminal 103 in accordance with a determined fade rate (for example based on one or more consecutive fade rate estimations) and then to determine a margin (e.g. for selecting a MODCOD) based on the determined link state and perhaps on additional parameters as well, wherein said additional parameters may be any of: a) a round trip delay between Hub 101 and terminal 103, b) an interval between consecutive FWD channel reception level estimations transmitted by terminal 103, and/or c) a preconfigured maximal link fade rate in any combination or sub-combination. Terminal 103 may be in one of two or more link states, wherein one of these states may be associated with stable link conditions and the other one or more states may be associated with link conditions of different degrees of instability. Hub 101 may be configured to determine a relatively low margin if terminal 103 may be in a state corresponding to stable link conditions, and relatively higher margin if terminal 103 may be in a state corresponding to instable link conditions.

In some embodiments, Hub 101 may be configured to determine that terminal 103 may be in one of two states or conditions, i.e. either in stable state corresponding to stable link conditions or in instable state corresponding to instable link conditions. Furthermore, Hub 101 may be configured to determine that terminal 103 may be in a stable state if a fade rate determined based on two or more consecutive FWD channel reception level estimations is lower than a first predefined threshold, and to determine that terminal 103 may be in an instable state if a fade rate determined based on one or more consecutive FWD channel reception level estimations is higher than a second predefined threshold, wherein said first and second thresholds may or may not be of the same value. In some embodiments, Hub 101 may be configured to determine that a terminal 103, which may be currently in a stable state, may be in an instable state following a first determining that a fade rate is higher than said second predefined threshold, and to determine that a terminal 103, which may be currently in an instable state, may be in a stable state only if all determined fade rates (i.e. one or more) over a predefined period may be lower than said first threshold.

In some embodiments, Hub 101 may be configured to determine that terminal 103 may be in one of three or more states or conditions. Furthermore, Hub 101 may be configured to determine that terminal 103 may be in one of the said states if a fade rate determined based on two or more consecutive FWD channel reception level estimations received from terminal 103 does not exceed a predefined threshold associated with this one state, wherein the threshold associated with this one state is the minimal threshold of all thresholds associated with all states which exceed the determined fade rate. In some further embodiments, Hub 101 may be configured to determine (in addition to or instead of a fade rate) maximal fluctuations in FWD channel reception level from said estimations and to determine that terminal 103 may be in one of said states if said maximal fluctuations do not exceed a predefined threshold associated with this one state, wherein the threshold associated with this one state is the minimal threshold of all thresholds associated with all states which exceed the determined maximal fluctuations. Once associating terminal 103 with a state, Hub 101 may be configured to determine a margin for terminal 103 based on said state wherein in some embodiments each state may be associated with a predefined margin. In addition, Hub 101 may be configured to determine that a terminal 103, which may be currently in a first state, may be in a second state corresponding to more instable conditions than those corresponding to the first state, following a first determining that a fade rate and/or maximal fluctuations is/are higher than the threshold(s) associated with the first state and lower than the threshold(s) associated with the second state. Hub 101 may be further configured to determine that a terminal 103, which may be currently in a first state, may be in a third state corresponding to more stable conditions than those corresponding to the first state, only if all determined fade rates (e.g., one or more) and/or maximal fluctuations estimations over a predefined period may be lower than the threshold(s) associated with the third state.

However, even under stable link conditions, FWD channel reception level estimations may slightly fluctuate, including between any two consecutive estimations (e.g. due to a phenomena often referred to as scintillations). Fluctuations of ±1 dB may be common, especially in Ka-band. At least for the purposes of minimizing loss of transmitted information (e.g. due to BER) and/or avoiding erratic behavior as a result of such fluctuations, system 100 may be configured to utilize hysteresis and/or respond quickly to fade (i.e. a drop in FWD channel reception level) and to slowly recover from fade. A terminal 103 may be configured to estimate the FWD channel reception level at a rate higher than the rate of transmitting FWD channel reception level estimations to the Hub 101. In other words, terminal 103 may be configured to estimate the FWD channel reception level multiple times (for example at even intervals) between any two consecutive transmissions of FWD channel reception level estimations towards Hub 101. Furthermore, when transmitting a FWD channel reception level estimation towards Hub 101, terminal 103 may be configured to set the transmitted estimation to the lowest FWD channel reception level estimated during a preconfigured period preceding said transmission, wherein this preconfigured period may be longer than the interval between consecutive FWD channel reception level estimation transmissions. Consequently, on one hand, any event of temporal fade between two consecutive FWD channel reception level estimation transmissions may be registered and reported to Hub 101 at the soonest FWD channel reception level estimation transmission. On the other hand, an event of temporal fade may be stored and reported over a longer period, thus perhaps preventing erratic FWD channel reception level estimations. In some embodiments, wherein terminal 103 may be configured to transmit a FWD channel reception level estimation at a typical rate of about once per second, terminal 103 may be further configured to estimate the FWD channel reception level at a rate 10 times as faster (i.e. approximately once every 100 mSec) and to hold the minimum estimation for a period 10 times longer than the interval between consecutive FWD channel reception level estimation transmissions (i.e. approximately for 10 seconds). In some embodiments, instead of selecting the lowest FWD channel reception level estimated during the preconfigured period preceding transmission of the estimation, terminal 103 may be configured to select the reported estimation using a different algorithm.

Figure 2:
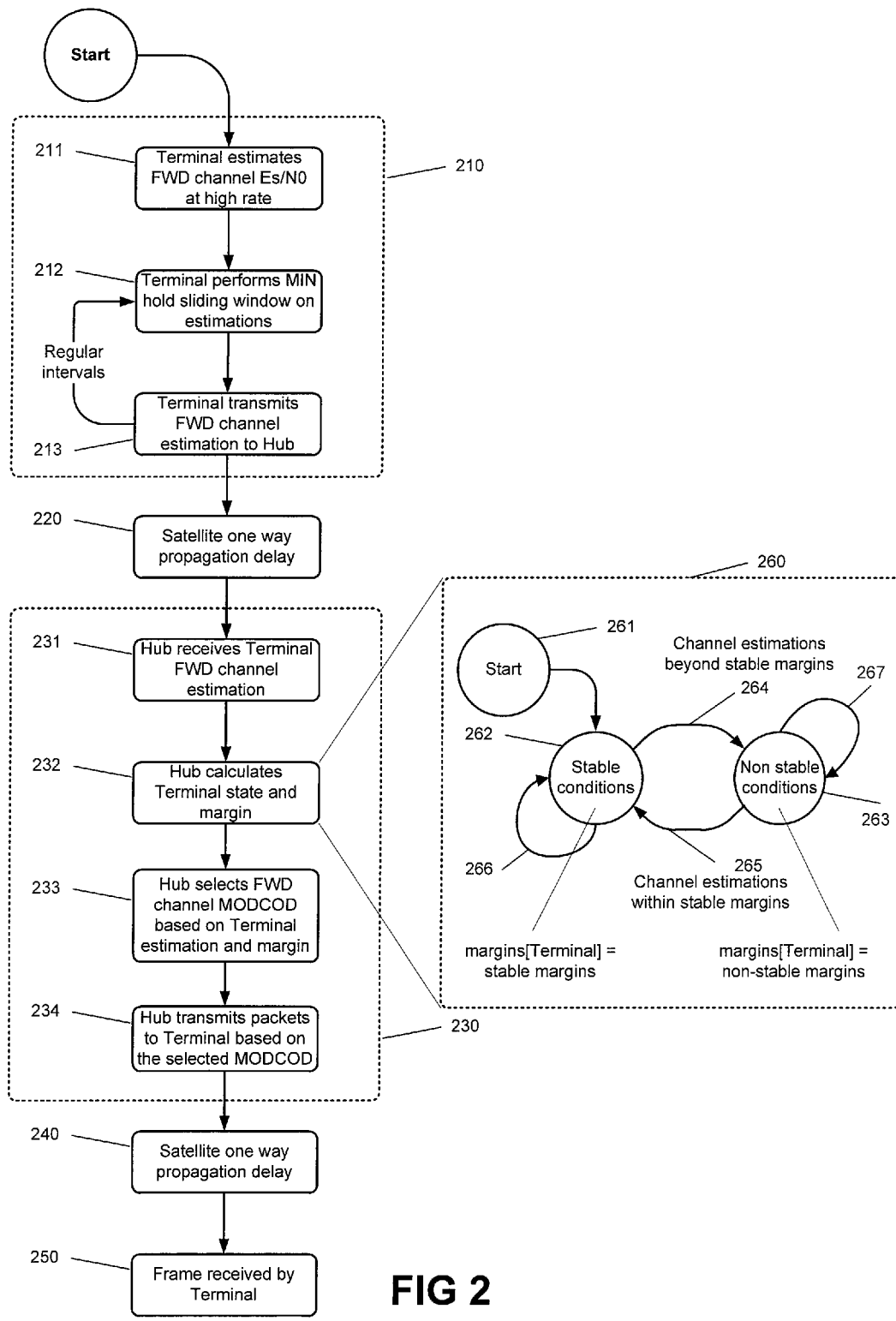
FIG. 2 shows a flow chart of a multiple adaptive margins algorithm for a FWD link in accordance with aspects of the disclosure.

FIG. 2 shows a flowchart that may present some aspects and embodiments previously discussed wherein section 210 of the flowchart may represent steps that may be performed by terminal 103 and section 230 of the flowchart may represent steps that may be performed by Hub 101. Terminal 103 may be configured to estimate FWD channel reception level (e.g. Es/N0, Eb/N0, SNR or any other measurement method) at a rate higher than the rate of transmitting FWD channel reception level estimations to Hub 101 (211), to select a lowest FWD channel reception level estimation during a preconfigured period (e.g. a sliding window) preceding a transmission of a FWD channel reception level estimation (212), and to transmit the selected FWD channel reception level estimation to Hub 101, wherein said selection and transmission may be performed at (preconfigured) regular intervals. Said selected FWD channel reception level estimation may be received by Hub 101 (231) after being delayed, for example by approximately a quarter of a second (220). Hub 232 may be configured to use at least the received FWD channel reception level estimation, as well as previously received one or more FWD channel reception level estimations, in order to determine a state for terminal 103 and a corresponding margin (232), for example using state machine 260. While FIG. 2 may depict a state machine 260 having two main states (i.e. excluding initial temporary start state 261), e.g. stable conditions state 262 and non-stable conditions state 263, different state machines containing three or more states may be used, with behavior similar to the one described herein and/or in accordance with a manner previously described above. Hub 101 may be configured to determine that terminal 103 may be in stable conditions state 262 as long as FWD channel reception level estimations may indicate stable link conditions (266). Upon determining that FWD channel reception level estimations may indicate non-stable link conditions (e.g. a calculated fade rate may exceed a predefined threshold and/or fluctuations may exceed a threshold), Hub 101 may determine (264) that terminal 103 may be in non-stable condition 263. Hub 101 may be configured to determine that terminal 103 may be in non-stable conditions state 263 as long as FWD channel reception level estimations may indicate non-stable link conditions (267). Upon determining that FWD channel reception level estimations may indicate stable link conditions (e.g. a calculated fade rate and/or fluctuations may be below predefined threshold(s) for a preconfigured interval), Hub 101 may determine (265) that terminal 103 may be in stable condition 262. Once the state at which terminal 103 may be determined, Hub 101 may be configured to determine a margin for terminal 103 (232) and then to use at least the said margin and FWD channel reception level estimations in order to select a FWD link MODCOD for terminal 103 (233). Hub 101 may be further configured to use the selected MODCOD (or more robust MODCODs) for transmitting data to terminal 103 (234). Any transmitted data may be delayed over the satellite (240) and received at terminal 103 (250).

As previously mentioned, terminal 103 of system 100 may be configured to transmit over the RTN channels using various power levels. Terminal 103 may be configured to modify its transmission power level, for example in accordance with parameters of the transmitted signal (e.g. symbol rate, modulation, FEC, etc.) and/or in order to compensate for changes in RTN link conditions (e.g. fade). In some embodiments, terminal 103 may be configured to set its transmission level so that the transmitted signal may be received at Hub 101 at a desired level (e.g. measured as SNR, Es/N0, Eb/N0 or using any other measurement method) in accordance with parameters of the transmitted signal (e.g. symbol rate, modulation, FEC, etc.), wherein said desired level may be equal to or higher than a reception QEF threshold corresponding to the parameters of the signal.

Figure 3:
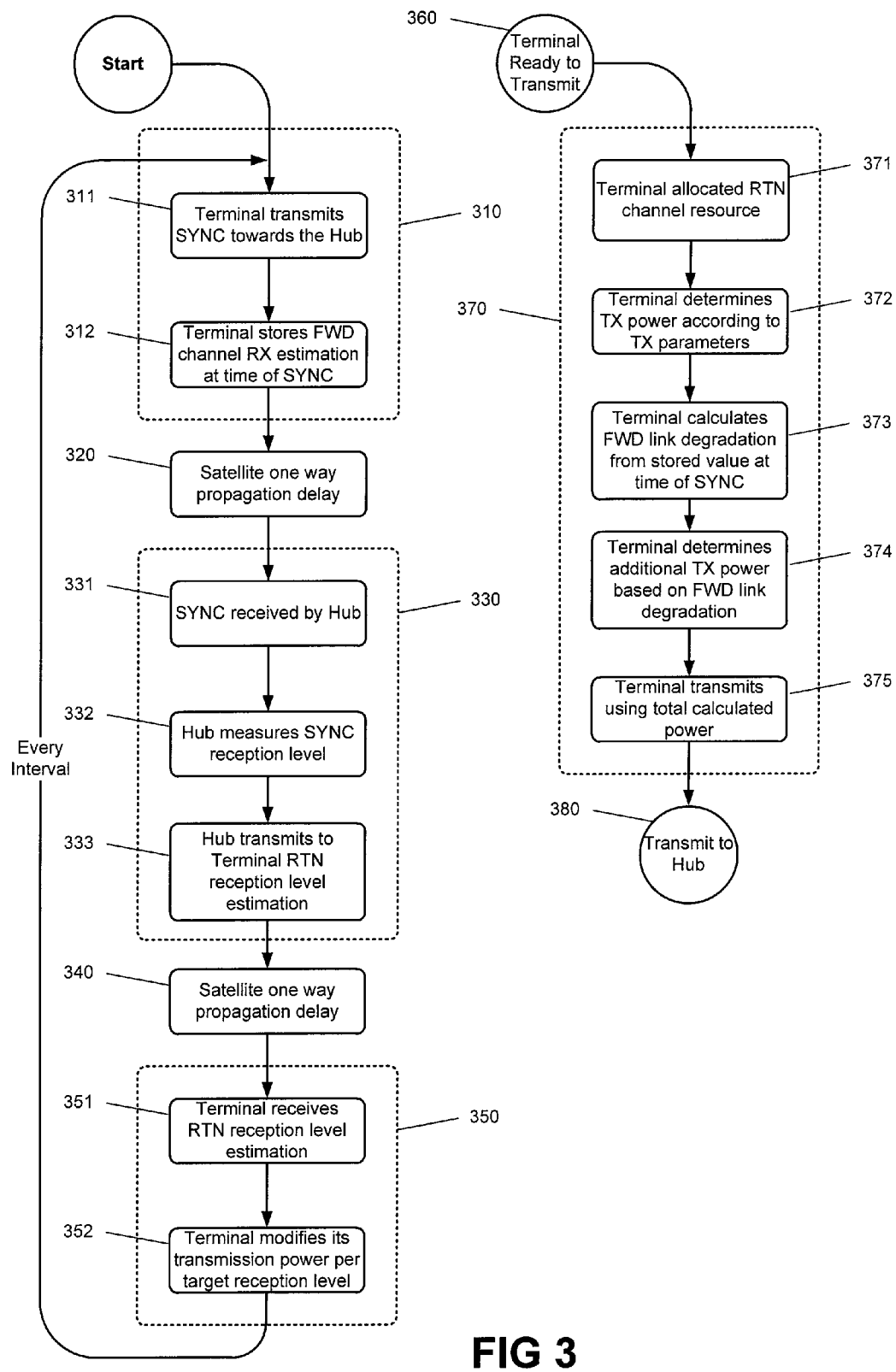
FIG. 3 shows a flow chart of an algorithm for controlling RTN link transmission power in accordance with aspects of the disclosure.

Aspects of the disclosure are directed to a method for determining and/or controlling a transmission power level of a RTN link signal transmitted by a terminal 103, the method may be based on analyzing RTN channel reception level estimations received from Hub 101, on FWD channel reception level estimations (as previously described) and on an adaptively modified transmission margin. In some embodiments, terminal 103 may be configured to further base said determining of transmission power level on transmission power level measurements, which terminal 103 may be configured to obtain from a transmitter included in terminal 103 (e.g. a block up converter (BUC) or a high power amplifier (HPA). FIG. 3 shows a flowchart that may present some aspects and embodiments of said method, wherein sections 310 and 350 and 370 of the flowchart may represent steps that may be performed by terminal 103 and section 330 of the flowchart may represent steps that may be performed by Hub 101.

Terminal 103 may be configured to transmit utility transmissions at regular intervals (311) (for example in order to provide Hub 101 with FWD channel reception level estimations, as previously described) and upon transmitting a utility transmission to store a FWD channel reception level estimation corresponding to the time of transmitting said utility transmission (312). In some embodiments, where the RTN link access scheme may follow the DVB-RCS recommendations, said utility transmissions may be SYNC bursts.

Hub 101 may be configured to receive utility transmissions from terminal 103 (331) and to estimate a RTN channel reception level (332), wherein said estimation may be based on measuring a reception level of the received utility transmission and wherein said estimation may be performed on a per terminal 103 basis. Hub 101 may be further configured to transmit (i.e. over the FWD channel) to each terminal 103 its corresponding RTN channel reception level estimations (333). Terminal 103 may be configured to receive RTN channel reception level estimations from Hub 101 (351) and to associate each estimation with a transmission power level used for transmitting the signal to which the estimation corresponds to (for example, based on settings of a programmable attenuator that may be configured for controlling transmission output power, or on transmission power level measurements, which terminal 103 may be configured to obtain from a transmitter included in terminal 103 (e.g. BUC)). Terminal 103 may be further configured to use said received RTN channel reception level estimations in order to determine a change in RTN link conditions, and to thereafter set at least a transmission power level property of a further transmitted signal in accordance with said determining (352). As terminal 103 may be configured to use a feedback from Hub 101 in order to determine change in RTN link conditions (i.e. a feedback which may be subjected to satellite round-trip delay), this technique may often be referred to as a Long Loop technique. Due to at least the satellite link propagation delay that may be inflicted on both the transmission of terminal 103 (320) and on the feedback from Hub 101 (340), said determining and/or setting of at least a transmission power level property of a further transmitted signal in accordance with determining a change in RTN link conditions may further include consideration of a margin. The transmission power property set for a further transmitted signal may be higher than the transmitted power level useful in order for the transmission to be received at Hub 101 at a nominal reception level (e.g. in accordance with a reception QEF threshold). The excess power (i.e. in accordance with said margin) may be utilized at least in order to insure proper reception (e.g. at or above reception QEF threshold) of said further transmitted signal at Hub 101, considering that RTN link conditions may change (e.g. fade) between the time the relevant RTN channel reception level has been estimated and the time of receiving said further transmission at hub 101.

As described above, terminal 103 may be configured to transmit towards Hub 101 utility transmissions at regular intervals (311), wherein said transmissions may include FWD channel reception level estimations at preconfigured intervals. Hub 101 may be configured to receive these utility transmissions (331), to estimate a RTN channel reception level for each received utility transmission (332) and to transmit said RTN channel reception level estimations back to terminal 103 (333). In some embodiments, terminal 103 may be configured to estimate the FWD channel reception level at a rate higher than the rate at which FWD channel reception level estimations may be transmitted to Hub 101 (for example at a rate 10 times higher, though other ratios may be used). As system 100 may be configured to maintain a constant power level for the FWD channel carrier as it may be transmitted by satellite 102 in the downlink, terminal 103 may be further configured to use FWD channel reception level estimations, including estimations not sent to Hub 101, in correlation with RTN channel reception level estimations received from Hub 101, for at least the purpose of estimating RTN link conditions and/or for adaptively determining a transmission margin that may be considered upon determining and/or adjusting a transmission power level in real time, or substantially in real time.

Again in reference to FIG. 3, a terminal 103, which may be ready to transmit information (360), may have an allocated RTN channel resource for transmitting said information (371). Terminal 103 may be configured to determine a transmission power level for transmitting over the allocated resource based on the resource characteristics (e.g. symbol rate, modulation, FEC, etc.) (372). Terminal 103 may be further configured to determine degradation in FWD channel reception level (373), for example to determine a current FWD channel reception level estimation and to compare it with a FWD channel reception level estimation previously stored for a last utility transmission (312), wherein said degradation may be the difference between the two estimations. Terminal 103 may then determine additional transmission power (margin) in accordance with the determine degradation in FWD channel reception level (374) and set the transmission power level for the transmitted signal (375) as the sum of the power level calculated based on the resource characteristics (372) and the determined additional power (374).

Figure 5:
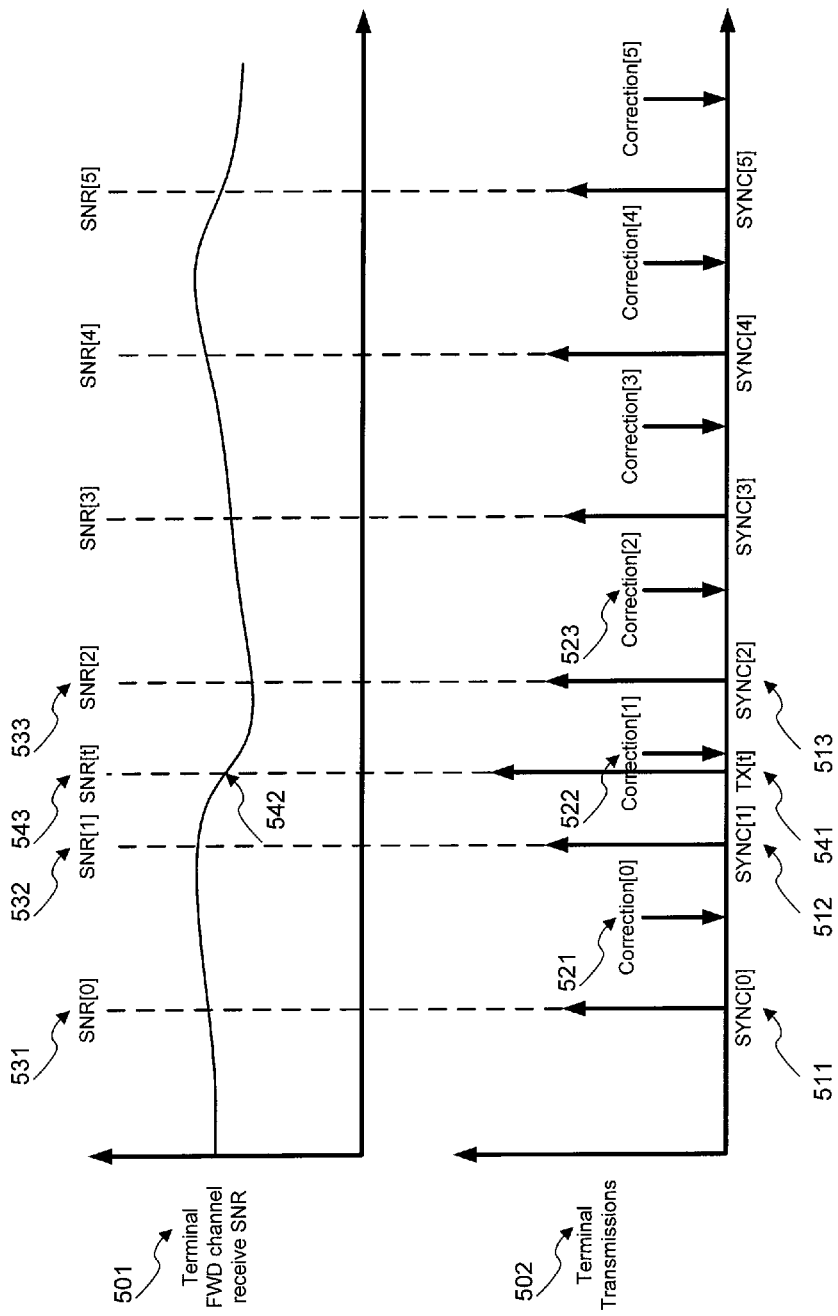
FIG. 5 shows an illustration of RTN link transmission power controlling in accordance with aspects of the disclosure.

FIG. 5 shows an illustration of the above described RTN link transmission power controlling method, wherein the utility transmissions are denoted as SYNC transmissions. Terminal 103 may periodically transmit SYNC transmissions towards Hub 101, for example SYNC transmissions 511, 512 and 513. In addition, terminal 103 may store FWD channel reception level estimations 531, 532 and 533 corresponding to the times of transmitting SYNC transmissions 511, 512 and 513 respectively. Hub 101 may receive SYNC transmissions 511, 512 and 513, estimate corresponding reception levels and transmit them as corrections 521, 522 and 523 respectively to terminal 103.

At some point in time t, for example after SYNC 512 is transmitted and before correction 522 is received, terminal 103 may need to transmit additional information 541. Terminal 103 may be configured to determine a FWD channel reception level 542 corresponding to the time of transmitting transmission 541 (or to a time which is not earlier from said transmission time by more than the interval between consecutive determinations of FWD channel reception levels). Terminal 103 may be further configured to calculate the difference between FWD channel reception level estimation 542 and FWD channel reception level estimation 531 corresponding to SYNC transmissions 511, which may be the last SYNC transmission for which a correction 521 has been received, to determine a margin based on said calculated difference, and to set the transmission level of transmission 541 in accordance with the transmission properties and the determined margin.

In some embodiments, a terminal 103 may be configured to determine its transmission margin in accordance with RTN link conditions as experienced by terminal 103 (e.g. in accordance with both FWD channel reception level and RTN channel reception level estimations as previously described) and independently of any such determining by other terminals. In some embodiments, terminal 103 may be configured to determine a RTN link state (e.g. in accordance with said RTN and FWD channels reception level estimations) and to determine its transmission margin in accordance with said determined RTN link state.

In some embodiments, terminal 103 may be configured to determine one of two RTN link states, a stable state and an instable state, and to determine a first (stable) margin when the RTN link may be in stable state and a second (instable) margin when the RTN link may be in an instable state, wherein the second (instable) margin may be larger than the first (stable) margin and wherein both first and second margins may be either preconfigured or configurable (e.g. as operation parameters, which may be provided to terminal 103 from time to time). Thus, terminal 103 may be configured to consider a relatively lower margin when the RTN link may be stable (e.g. for at least the purpose of increasing transmission efficiency) and to consider a relatively higher margin when the RTN link may be instable (e.g. for at least the purpose of insuring proper reception of transmitted signal at Hub 101 in spite of the link instability).

Furthermore, terminal 103 may be configured to utilize hysteresis, i.e. to quickly assume an instable RTN link state (i.e. upon detecting a drop in RTN channel reception level and/or a drop in FWD channel reception level), and to resume a stable RTN link state only after the RTN link may be stable for a preconfigured interval.

In some embodiments, terminal 103 may be configured to determine more than two states and to associate each state with a respective margin (either preconfigured or configurable as described above), wherein a margin associated with a more stable state may be lower than a margin associated with a less stable state. In some embodiments, terminal 103 may be configured to determine said margins by directly calculating them in accordance with a predetermined formula or in accordance with a predetermined algorithm, i.e. without determining a discrete link state, wherein the inputs to such formulas or algorithms may be any of FWD channel reception level estimations, RTN channel reception level estimations, operational parameters regarding expected FWD and/or RTN link(s) performance(s) and/or any other measurements or parameters, and wherein the formula or the algorithm used may be configured to determine a minimal margin when a the RTN link may be stable and to increase the margin as RTN link conditions deteriorate and/or fluctuate rapidly.

Aspects of the disclosure are directed to a method for determining an adaptive allocation margin for a RTN link at a hub 101.

In some embodiments, system 100 may utilize an access scheme for the RTN channels (for example in accordance DVB-RCS recommendations) in which different parts of the RTN channels resources (e.g. channels or timeslots) may have different characteristics (for example symbol rate, modulation, FEC, etc.). Consequently, each such part of the RTN channels resources may have terminal 103 transmit at a different transmission power level in order for the transmission to be received at Hub 101 at an appropriate level corresponding to the characteristics of the resource, for example a QEF level with perhaps an additional reception margin. In such system 100, Hub 101 may also be configured to determining a RTN link state (e.g. in accordance with said RTN channel estimations, and/or in accordance with a RTN link state information that may be transmitted by terminal 103 and received by Hub 101). Upon determining a RTN link state for terminal 103, Hub 101 may further determine an allocation margin corresponding to the RTN link state and consider this allocation margin upon allocating RTN channel resources to terminal 103. For example, Hub 101 may be configured to determine, for example based on RTN channel reception level estimations, whether a transmission over a RTN channel resource by terminal 103 at a terminal's maximal transmission power level may or may not be received at Hub 101 at an appropriate reception level, wherein said appropriate reception level may be determined in accordance with the characteristics of the RTN channel resource and in accordance with an allocation margin corresponding to the RTN link state of terminal 103. Hub 101 may be further configured to allocate a RTN channel resource to terminal 103 only if it determines that a transmission by terminal 103 over said RTN channel resource may be received at the appropriate reception level, as previously described.

The allocation margin may be used by system 100, for example, in order to compensate for fades in the RTN link, which may occur between RTN channel reception level estimations and/or between the allocation time and the transmission time. In some embodiments, Hub 101 may be configured to determine a relatively small allocation margin when the RTN link state corresponds to stable RTN link conditions, and to determine a relatively larger allocation margin when the RTN link state corresponds to non-stable and/or considerable fluctuating RTN link conditions. Furthermore, Hub 101 may be configured to utilize hysteresis and/or respond quickly to fade (e.g. a significant drop in RTN channel reception level) and to slowly recover from fade. For example, Hub 101 may be configured to increase the allocation margin as soon as non-stable RTN link conditions may be suspected, and to reduce the allocation margin (e.g. either partly or back to the level corresponding to a stable RTN link state) only after the RTN link may be stable again for a preconfigured interval.

Figure 4:
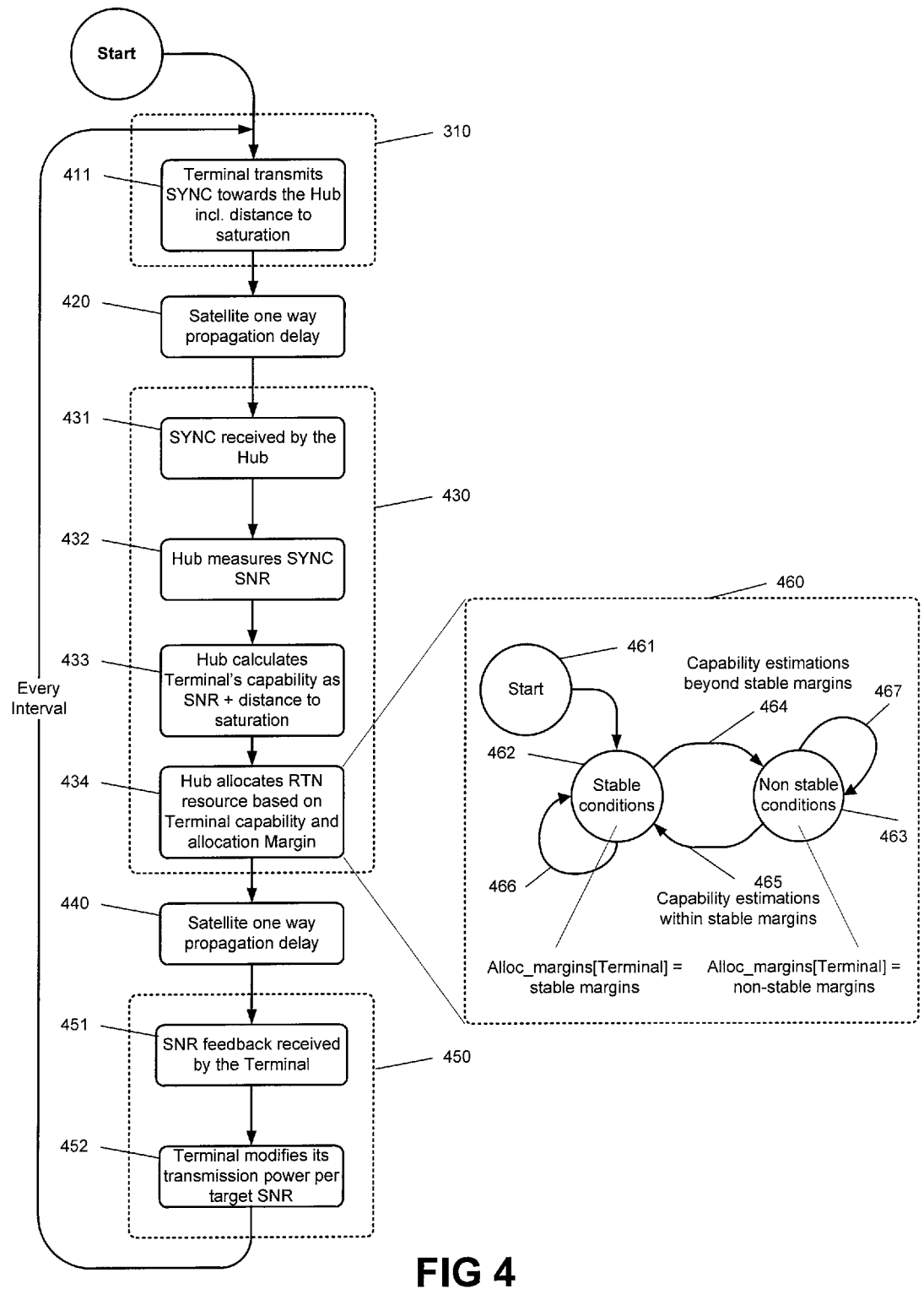
FIG. 4 shows a flow chart of a multiple adaptive allocation margins algorithm for a RTN link in accordance with aspects of the disclosure.

FIG. 4 shows a flowchart that may present some aspects and embodiments of the above described method, wherein sections 410 and 450 of the flowchart may represent steps that may be performed by terminal 103 and section 430 of the flowchart may represent steps that may be performed by Hub 101.

Terminal 103 may be configured to transmit utility transmissions at regular intervals (411) wherein a utility transmission may include information regarding the maximal transmission power available for terminal 103 in reference to the transmission power level of that transmission (e.g. distance to saturation). In some embodiments, a utility transmission may also include FWD channel reception level estimation. In some embodiments, where the RTN link access scheme may follow DVB-RCS recommendations, system 100 may be configured to use SYNC bursts as said utility transmissions. Hub 101 may be configured to receive a utility transmission (431), to measure a reception level for the received utility transmission (432) (e.g. Es/N0, Eb/N0, SNR or any other measurement method) and to determine a capability figure for terminal 103 based on the measured reception level and on said maximal transmission power information (e.g. distance to saturation) included in the received utility transmission. In some embodiments, Hub 101 may determine said capability as the sum of a measured reception level (e.g. SNR) and a reported distance to saturation, both corresponding to the same transmission (433). Hub 101 may be further configured to use said capability and an allocation margin while allocating RTN channel resources to terminal 103 (434), wherein said allocation margin may be determined in accordance with a RTN link state, which Hub 101 may determine for terminal 103, for example using state machine 460. While FIG. 4 may depict a state machine 460 having two main states (i.e. excluding initial temporary start state 461), e.g. stable conditions state 462 and non-stable conditions state 463, different state machines containing three or more states may be used, with behavior similar to the one described herein and/or in accordance with a manner previously described above.

Hub 101 may be configured to determine that terminal 103 may be in stable conditions state 462 as long as fluctuations in its capability estimations may be lower than a predefined threshold and/or may indicate stable link conditions (466). Upon determining that capability estimations may indicate non-stable link conditions (e.g. a calculated degradation or fade rate may exceed a predefined threshold and/or fluctuations may exceed a threshold), Hub 101 may determine (464) that terminal 103 may be in non-stable conditions state 463. Hub 101 may be configured to determine that terminal 103 may be in non-stable conditions state 463 as long as capability estimations may indicate non-stable link conditions (467), as previously described. Upon determining that capability estimations may indicate stable link conditions (e.g. a calculated degradation, fade or change rate and/or fluctuations may be below predefined threshold(s) for a preconfigured interval), Hub 101 may determine (465) that terminal 103 may be in stable conditions state 462.

Once the state at which the RTN link of terminal 103 may be determined, Hub 101 may be configured to determine an allocation margin for terminal 103 and to use it while allocating RTN channel resources to terminal 103 (434). Hub 101 may then transmit allocation information as well the measured reception level for the last received utility transmission (i.e. reception level feedback) to terminal 103 over the satellite (440). Terminal 103 may receive the reception level feedback (451) and then adjust further transmissions in accordance with the feedback and in accordance with transmitted signal parameters (452).

Aspects of the disclosure are directed to a possible linkage between a FWD link state and a RTN link state.

As previously described, Hub 101 may be configured to determine for each terminal 103 a FWD link state and a RTN link state, and to determine a FWD link allocation margin and a RTN link allocation margin corresponding to said determined link states, wherein determining the FWD link state may be independent of determining a RTN link state. For example, terminal 103 may be at a given time in a stable state for the FWD link and in a non-stable state for the RTN link (or vice versa). In some embodiments, where there may be more than two states for each link, there may be even more possibilities for the two links to be in different states, for example one link may be stable while the other may be non-stable or one link may be at some degree of instability while the other link may be at another degree of instability.

In some embodiments, Hub 101 may be configured to enforce linkage between a FWD link state and a RTN link state of a terminal 103. Hub 101 and/or terminal 103 may be configured to assume a less stable state for both the FWD link and the RTN link in the event of any one of the FWD link or the RTN link becoming more instable. For example, upon determining that the RTN link may be non-stable, Hub 101 and/or terminal 103 may be configured to also determine that the FWD link is also non-stable, even though FWD channel reception level estimations may not have indicated that. Furthermore, Hub 101 and/or terminal 103 may be configured to simultaneously assume a more stable state for both the FWD link and the RTN link only after stable conditions are determined for both links.

Various aspects of the disclosure may be embodied as one or more methods, systems, apparatuses (e.g., components of a satellite communication network), and/or computer program products. Accordingly, those aspects may take the form of an entirely hardware embodiment, an entirely software embodiment, an entirely firmware embodiment, or an embodiment combining firmware, software, and/or hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In some embodiments, one or more computer readable media storing instructions may be used. The instructions, when executed, may cause one or more apparatuses to perform one or more acts described herein. The one or more computer readable media may comprise transitory and/or non-transitory media. In addition, various signals representing data or events as described herein may be transferred between a source and a destination in the form of electromagnetic waves traveling through signal-conducting media such as metal wires, optical fibers, and/or wireless transmission media (e.g., air and/or space).

Modifications may be made to the various embodiments described herein by those skilled in the art. For example, each of the elements of the aforementioned embodiments may be utilized alone or in combination or sub-combination with elements of the other embodiments. It will also be appreciated and understood that modifications may be made without departing from the true spirit and scope of the present disclosure. The description is thus to be regarded as illustrative instead of restrictive on the present disclosure.

What is claimed is:

1. A method comprising:
    receiving, by a hub and from a first terminal, selected forward channel reception level estimations determined by the first terminal;
    determining, by the hub and based on the selected forward channel reception level estimations, a fade rate corresponding to a rate at which a forward channel reception level at the first terminal changes;
    determining a margin associated with the first terminal based on the fade rate and one or more of: a) a round trip delay between the hub and the first terminal, b) an interval between the selected forward channel reception level estimations, or c) a preconfigured maximal link fade rate; and selecting, based on the margin associated with the first terminal, a Modulation and Coding (MODCOD) for a transmission to the first terminal.

2. The method of claim 1, wherein the selecting the MODCOD is further based on at least one of the selected forward channel reception level estimations.

3. The method of claim 1, further comprising:
receiving, by the hub and from the first terminal, at least one of a second fade rate or a second margin; and
determining, by the hub, a third margin based on at least one of the second fade rate or the second margin.

4. The method of claim 1, further comprising:
determining a state of a forward link used to transfer data from the hub to the first terminal,
wherein the determining the margin is further based on the state of the forward link.

5. The method of claim 4, wherein the determining the state of the forward link comprises determining whether the state of the forward link is one of a stable state or an instable state.

6. The method of claim 1, wherein the determining the margin comprises:
determining a first margin if a state of a forward link is stable; or
determining a second margin if the state of the forward link is not stable,
wherein the second margin is greater than the first margin.

7. The method of claim 1, further comprising:
determining that the first terminal is associated with a first forward link state following a determination that the fade rate is higher than a first predefined threshold; or
determining that the first terminal is associated with a second forward link state if all of one or more determined fade rates over a predefined period are lower than a second predefined threshold,
wherein the second forward link state is more stable than the first forward link state.

8. The method of claim 1, wherein the determining the margin comprises:
determining that the first terminal is associated with a stable forward link state if the fade rate is lower than a first threshold; or
determining that the first terminal is associated with an instable forward link state if the fade rate is not lower than a second threshold.

9. The method of claim 1, further comprising:
transmitting, from the hub to the first terminal, a first signal using the MODCOD.

10. The method of claim 9, further comprising:
transmitting, from the hub to a second terminal that is different from the first terminal, a second signal using a second MODCOD selected based on a second margin associated with the second terminal.

11. An apparatus configured to:
transmit, to a hub, a utility transmission;
store a first forward channel reception level estimation associated with the utility transmission;
receive a reception level estimation associated with the utility transmission;
associate the reception level estimation with a power level used for transmitting the utility transmission;
determine a change in a return link condition based on the reception level estimation; and
set, based on the change in the return link condition and a transmission margin, a transmission power level for transmitting a subsequent transmission from the apparatus to the hub, wherein the transmission margin corresponds to a difference between a second forward channel reception level estimation associated with the subsequent transmission and the first forward channel reception level estimation.

12. The apparatus of claim 11, further configured to transmit a second utility transmission at a preconfigured time period after transmitting the utility transmission.

13. The apparatus of claim 11, further configured to periodically estimate forward channel reception levels, wherein the first forward channel reception level estimation is one of the estimated forward channel reception levels.

14. The apparatus of claim 11, wherein the reception level estimation is determined based on a measurement, by the hub, of a reception level of the utility transmission.

15. The apparatus of claim 11, further configured to determine the transmission power level based on a value of a programmable attenuator included in the apparatus or a transmission power level measurement obtained from a transmitter of the apparatus.

16. An apparatus configured to:
receive, from a terminal, a utility transmission including transmission capability information;
determine a reception level estimation for the utility transmission;
determine a capability figure for the terminal based on the reception level estimation and the transmission capability information;
determine a capability fluctuation associated with the terminal based on consecutively determined capability figures comprising the capability figure and another capability figure;
determine a return link state corresponding to the determined capability fluctuation;
determine an allocation margin in accordance with the determined return link state; and
select a return channel resource for allocation to the terminal in accordance with any of the capability figure of the terminal and the allocation margin.

17. The apparatus of claim 16, wherein the apparatus is configured to measure a reception level of the received utility transmission to determine the reception level estimation.

18. The apparatus of claim 16,
wherein the transmission capability information comprises a distance from saturation value, and
wherein the apparatus is configured to calculate the capability figure as a sum of the determined reception level estimation and the distance from saturation to determine the capability figure for the terminal.

19. A method comprising:
determining, by a hub, a forward link state and a return link state on a per terminal basis;
determining, by the hub, a particular forward link allocation margin for a particular terminal corresponding to a particular forward link state determined for the particular terminal;
determining, by the hub, a particular return link allocation margin for the particular terminal corresponding to a particular return link state determined for the particular terminal;
selecting, by the hub, a Modulation and Coding (MODCOD) for transmitting towards the particular terminal in accordance with the particular forward link allocation margin; and
allocating, by the hub, a return link resource to the particular terminal in accordance with the particular return link allocation margin.

20. The method of claim 19, further comprising:
  enforcing linkage between a particular forward link state of a particular forward link for the particular terminal and a particular return link state of a particular return link for the particular terminal.

\* \* \* \* \*